Sept. 5, 1961 M. HAGLUND 2,998,653
GEODETIC INSTRUMENT PARTICULARLY MINE SURVEYING INSTRUMENT
Filed Sept. 30, 1957 8 Sheets-Sheet 1

FIG.1

Sept. 5, 1961 M. HAGLUND 2,998,653
GEODETIC INSTRUMENT PARTICULARLY MINE SURVEYING INSTRUMENT
Filed Sept. 30, 1957 8 Sheets-Sheet 2

Sept. 5, 1961    M. HAGLUND    2,998,653
GEODETIC INSTRUMENT PARTICULARLY MINE SURVEYING INSTRUMENT
Filed Sept. 30, 1957    8 Sheets-Sheet 6

INVENTOR:
Mats J. Haglund
BY:
Pierce, Scheffler & Parker
ATTORNEYS.

Sept. 5, 1961  M. HAGLUND  2,998,653
GEODETIC INSTRUMENT PARTICULARLY MINE SURVEYING INSTRUMENT
Filed Sept. 30, 1957  8 Sheets-Sheet 7

INVENTOR
Mats Haglund
By
Pierce, Scheffler & Parke
Attorneys

United States Patent Office 2,998,653
Patented Sept. 5, 1961

2,998,653
GEODETIC INSTRUMENT PARTICULARLY MINE SURVEYING INSTRUMENT
Mats Haglund, Strassa, Sweden, assignor to Trafikaktiebolaget Grangesberg-Oxelosund and Luossavaara-Kiirunavaara AB, both of Gustaf Adolfstorg 18, Stockholm, Sweden
Filed Sept. 30, 1957, Ser. No. 687,092
16 Claims. (Cl. 33—69)

In mine measuring in Sweden a theodolite is as a rule used for gallery and shaft measurements and mine surveying instruments (mine tube rule) for measuring the outlines of rock chambers, and for simpler direction layout et cetera. The mine surveying instrument does not operate as accurately as the theodolite, but in return it operates much more quickly. However, both instruments have the disadvantage that the material of observation must be calculated and collocated after the measurements have been brought to an end, a work which can be estimated to a third or a half of the total time used for the measuring operation. This implies that the result of the measuring does not benefit the mine until earliest the day after the measuring and as a rule only two days after the measuring.

Thus, an instrument which substantially combines the accuracy of the theodolite with the rapidity of the mine surveying instrument, and which collocates the material of observation to a uniform map of the measuring according as it proceeds, is desirable.

These desiderata are fulfilled by the instrument according to the present invention.

The object of the invention is to provide a geodetic instrument, particularly a mine measuring instrument for dotting measured points according to a certain scale on a paper, provided with a telescope, which is pivotal on a horizontal axis at right angles thereto in an upper part of the instrument, which upper part is pivotal on a vertical axis in a lower part of the instrument carried by a frame, e.g. tripod, and possibly further provided with a horizontal circle and a vertical circle for indicating the azimuth and the height angles respectively of the tube. The instrument according to the invention is substantially characterized in that it comprises (a) a chequered plate substantially parallel with the vertical plane through the tube and graduated with vertical and horizontal lines which form the ordinates and abscissae of a coordinate system having an origin, which plate through a paralleling device carried by the said upper part is guided in parallel with itself, (b) a device for moving the chequered plate in such a manner that its origin is displaced along a line parallel with the optical axis of the tube from a zero position located in the horizontal axis, (c) a device for reading off the magnitude of the displacement of origin from the zero position (the horizontal axis), (d) a device for reading off the chequered plate in order to determine the components of the displacement thereof, (e) a device for horizontal displacement of the paper in parallel with the vertical plane of the optical axis proportional to the horizontal displacement of the chequered plate.

The method in measuring between two measuring frames, A and B, for example tripods, is fundamentally carried out in the following manner with the present instrument, when the latter is used for graphical measurements. (The instrument may also be used as a repetition theodolite.) At the beginning of the measuring operation A is located in the vertical axis of the instrument, indicated by a prick in a paper attached to the lower part of the instrument. The telescope is trained towards B. The paper is loosened from the lower part of the instrument and is moved without being turned some distance in the scale of the diagram, corresponding to the horizontal distance between A and B straight towards B, whereafter it is again fixed to the said lower part. The instrument is moved to B and is trained towards A with the telescope reversed, without its upper part being turned in relation to the paper.

The process described involves that both in reality and on the paper one has moved from A to B, that B now is located in the vertical axis, and that the paper is orientated in the right way in relation to A. Also B is indicated by a prick in the paper.

How the different parts of the instrument function during the described process of measuring will now be explained in detail with reference to an embodiment shown in the drawing.

The attachment of the instrument to the frame tripod and horizontation are carried out in a conventional manner.

In order to introduce a paper 1 into the instrument one turns a worm screw 2 indisplaceably provided in the lower portion 1a and thereby also a ring 3 engaging the said screw, which ring is concentrical with the vertical axis and provided with pins 4 which project into recesses formed with oblique upper surfaces and situated at the lower edge of a ring 5 concentric with the ring 3, the said ring 5 being depressed by springs 6. The ring 5 is provided with vertical pins 7 which are guided in grooves in the said lower part and thereby prevent the ring 5 from turning. At the said turning of the worm 2 the pins 4 will thus lift the ring 5 with the aid of the said oblique surfaces, whereafter the paper can be inserted under the said ring 5. By turning the worm 2 in the opposite direction the ring 5 is thereafter lowered and locks the paper to the lower part of the instrument.

Figure 1:
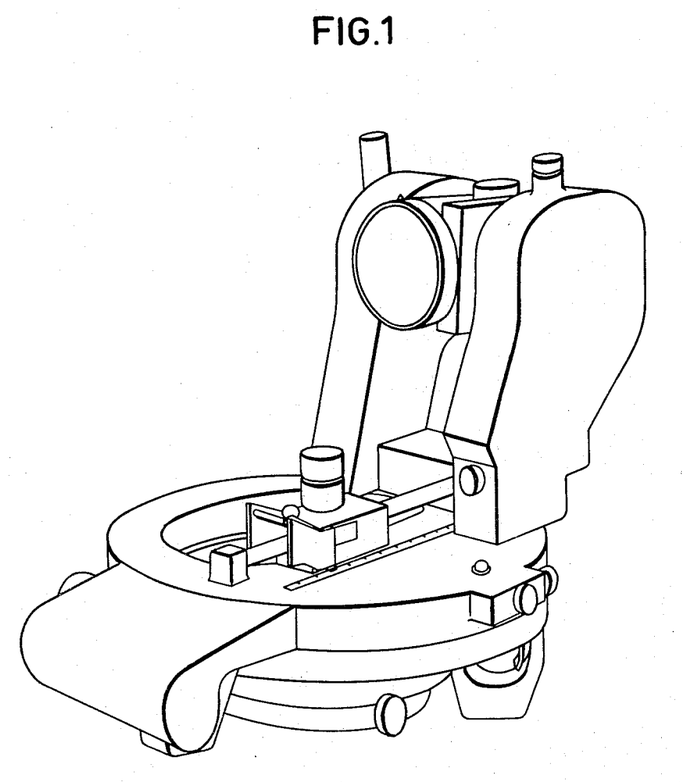
FIGURE 1 shows a perspective view of the instrument.
Figure 2:
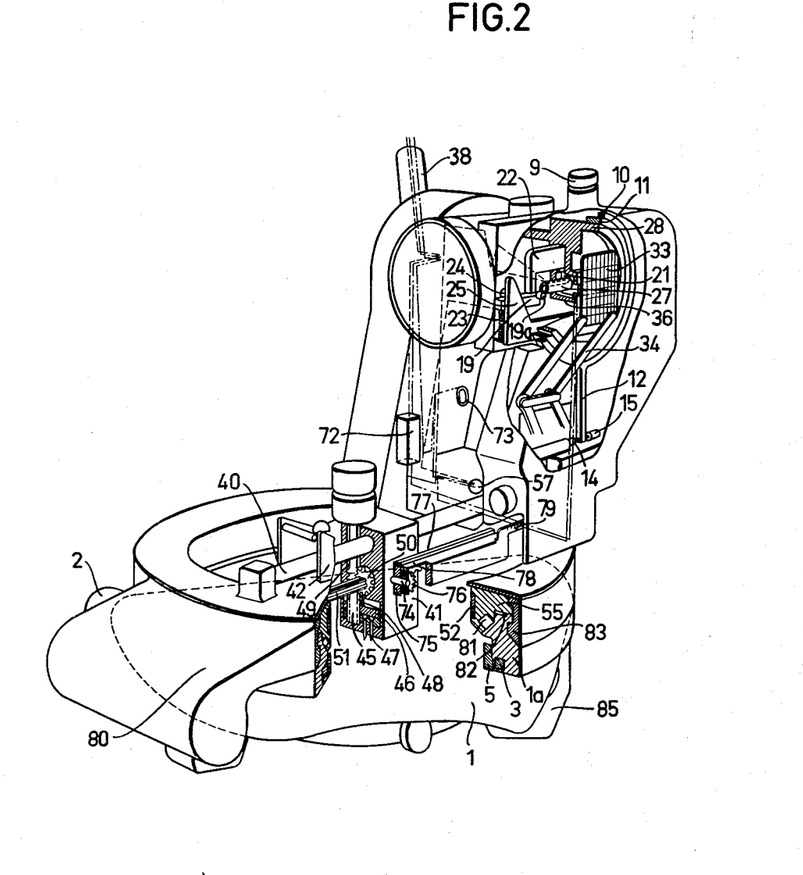
FIGURE 2 shows the same view, although partly in section.
Figure 3:
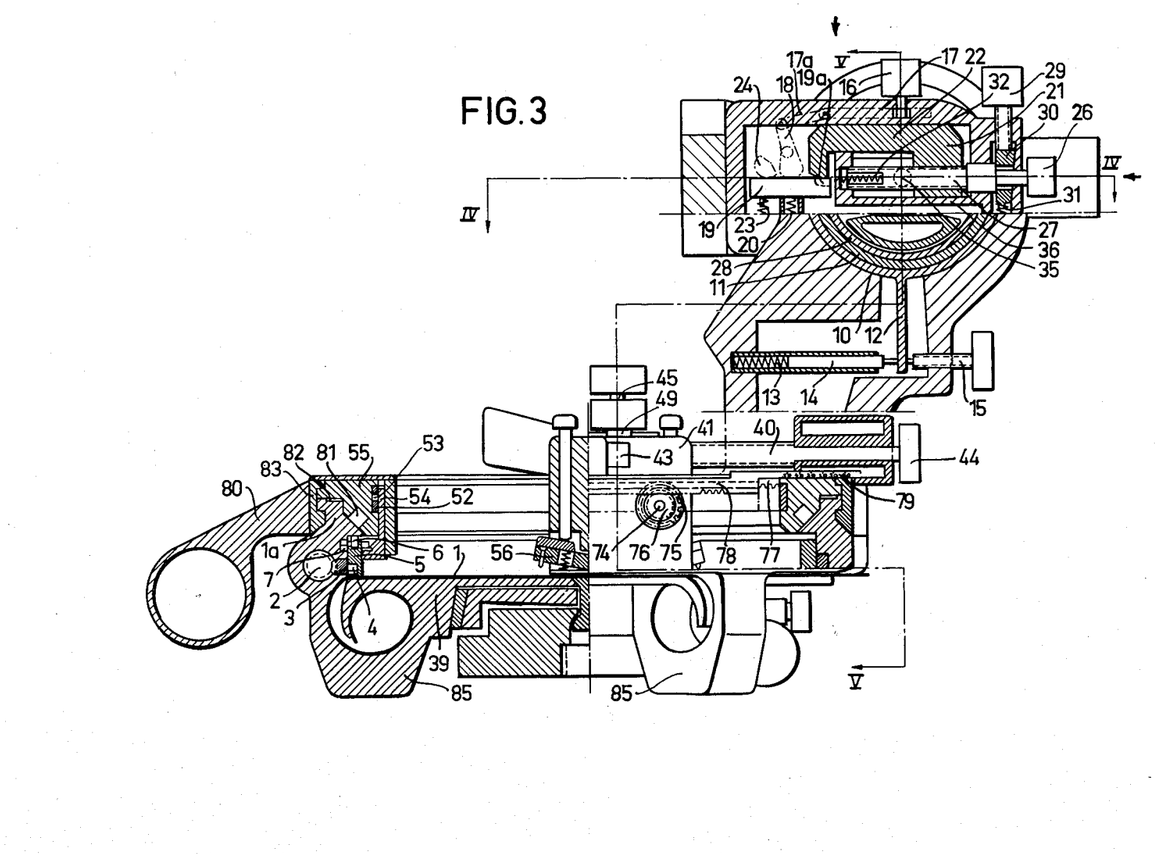
FIGURE 3 shows the instrument in section along the line III—III in FIGURES 4 and 5.
Figure 4:
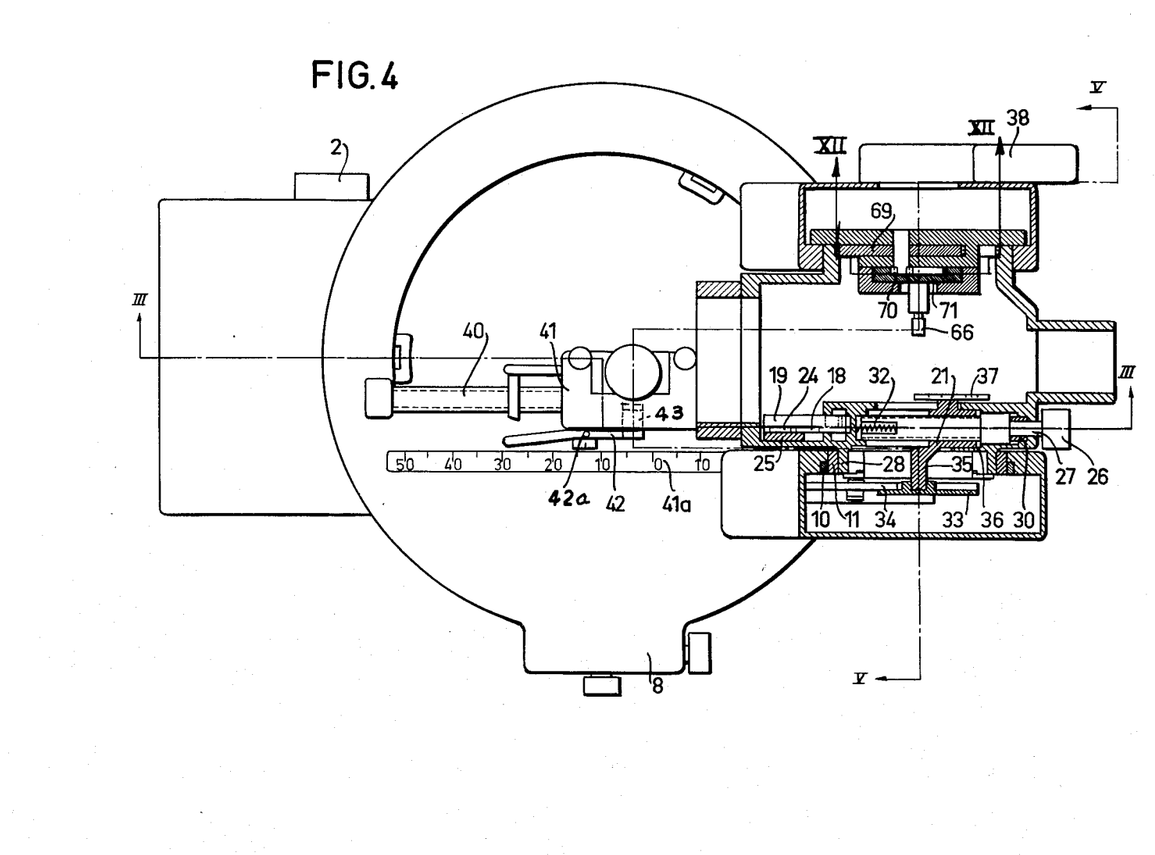
FIGURE 4 shows a section along the line IV—IV in FIGURES 3 and 5.
Figure 5:
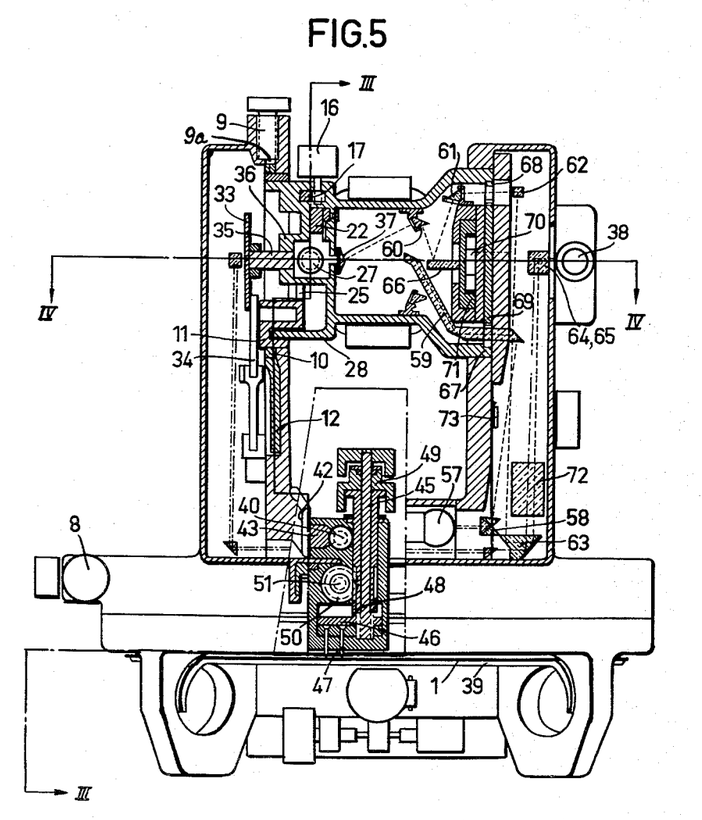
FIGURE 5 shows a section along the lines V—V in FIGURES 3 and 4.
Figure 7:
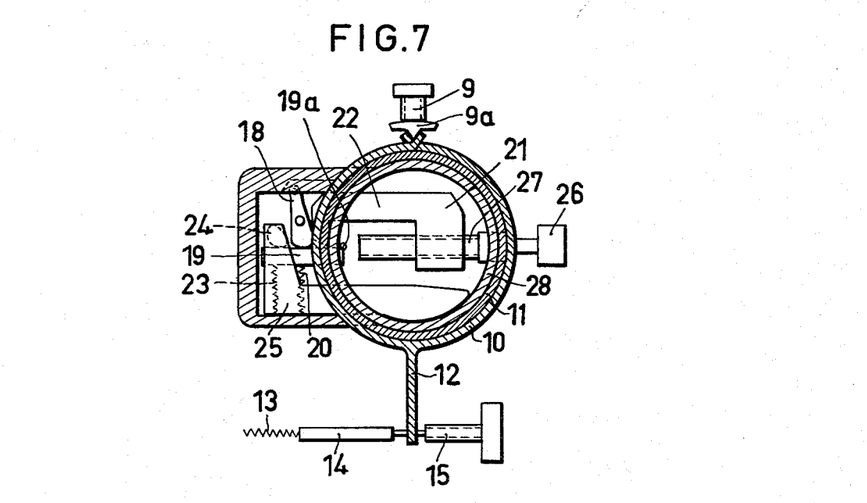
FIGURE 7 is a detailed sectional view of the means of FIGURE 3 for locking and fine adjustment of the telescope in the vertical direction, said means being in the original position.
Figure 8:
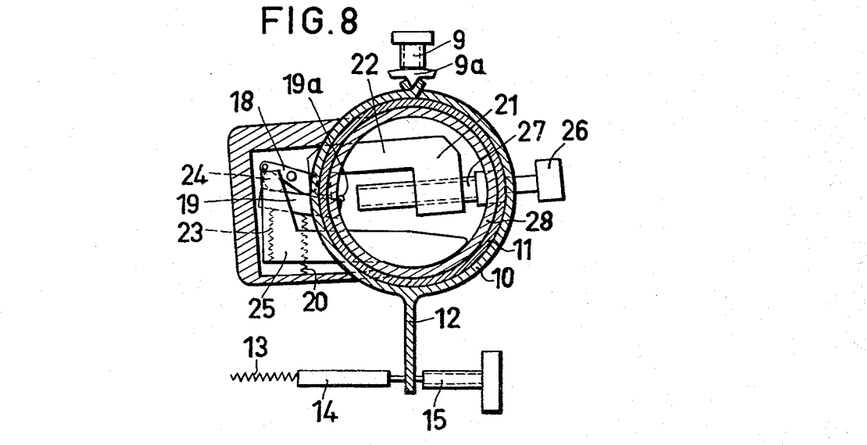
FIGURE 8 is a detailed view similar to that of FIGURE 7 following an adjustment of said locking and fine adjustment means.
Figure 9:
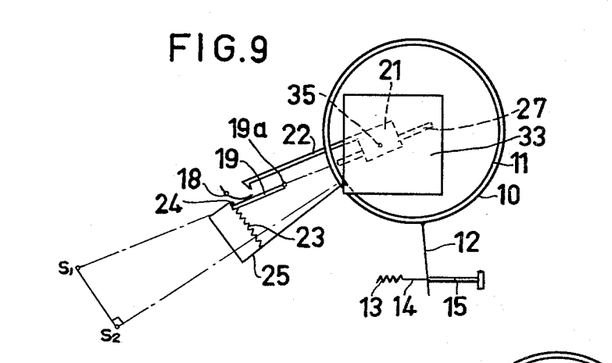
FIGURE 9 is a schematic diagram of the adjusting means corresponding to FIGURE 7, and FIGURES 10 and 11 are schematic diagrams of the adjusting means corresponding to FIGURE 8.
Figure 10:
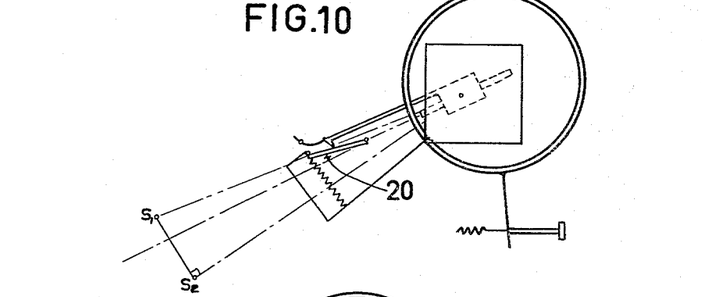
Figure 11:
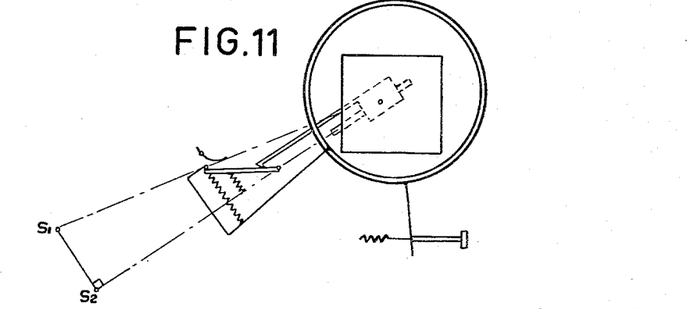

The tube (i.e., the telescope) is trained approximately to the top of the signal which for example is about 50 centimetres long, and is locked so as not to turn about the vertical axis, whereafter the lateral setting is finely adjusted. The device 8 by means of which this lateral setting is carried out, may be of a well-known kind. The locking and the fine adjustment in vertical direction, on the other hand, differs from the conventional method and will therefore be described in detail. The telescope pivots in the vertical plane about the horizontal telescope shaft 28 (FIGS. 2, 3, 4 and 5) mounted in a bearing ring 11. After the telescope has been freely pivoted about this horizontal shaft for coarse sighting upon the top of the object, screw 9 is tightened to force wedge 9a between the overlapping flange portions of the split ring 10 to clamp the same upon the bearing ring 11 as shown in FIGS. 5 and 7. The split ring 10 has an arm portion 12 radially extending downwardly therefrom which is biased by spring 13 and piston 14 into engagement with screw 15. Thus after the telescope horizontal shaft 28 (about which the telescope pivots in the vertical plane) has been rigidly clamped to split ring 10 by the tightening action of screw 9 and wedge 9a, fine adjustment of the telescope in the vertical plane may be achieved by the action of screw 15 on arm 12. It is to be noted that wedge 9a is not rigidly connected to screw 9 but rather slight relative movement between the two elements is permitted in the plane of the split ring 10. Thus as screw 15 is tightened to pivot arm 12 to the left in FIGS. 3 and 7, split ring 10, wedge 9a, bearing ring 11 and telescope horizontal shaft 28 will be rotated as a unit in the clockwise direction. Although the determination of the distance from the instrument to the signal or target can be made, for example, by means of a tape measure, a more automatic device for determining the length will here be described. By turning a knob 16, a gear connected therewith will drive the rack 17 (located above the plane of the paper in FIGURE 3) and thereby, via a link 17a, turn the eccentric arm 18, so that a telescope inclination plate 19 with plane upper surface and turnable about a horizontal shaft 19a rigidly connected with the telescope and located at the right end of the said surface, will be released so as to be turned upwards by means of the spring 20, which presses the plate 19 upwards until it rests against the arm 22 of the nut 21 (FIG. 8). Besides, the plate 19 is forced by the spring 23 to rest against a pin 24 fixed to an arm 25 on the ring 11. Thus, the inclination of the telescope will be regulated by the inclination of the plate 19 attached thereto. By turning the knob 26 of the screw 27 (which is axially immovable and which extends perpendicular to the horizontal pivot axis and parallel with the optical axis of the instrument), a reciprocatory motion is imparted to the nut 21, whereby the vertical adjustment of the telescope about the horizontal pivot shaft 28 is changed. The knob 26 is turned until the telescope is nearly directed toward the lower end of the signal. Thereafter the vertical setting is finely adjusted by turning the knob 29. This knob is fixed to a screw against which the wedge-shaped piece 30 is pressed by a spring 31 below the piece 30 (FIG. 3). The screw 27 is likewise pressed against the wedge-shaped piece 30 by a spring 32. Thus, by turning the knob 29 an upward or downward motion is imparted to the piece 30, which in turn causes a change of the position of the screw 27 in the axial direction and thereby also a change of height, although small of the telescope by the displacement, brought about thereby, of the point of the arm 22 in relation to the plate 19. The signal is so directed that its lower end forms the apex of a right triangle, with one leg along the signal and the other leg through the instrument. Referring to FIGS. 9–11, in the original position of FIG. 9 the optical axis is directed toward the top $S_1$ of the object. In this position the eccentric 18 holds the plate 19 (which is pivotally connected at its right end 19a to the telescope) parallel with the optical axis. Thereafter the eccentric 18 is swung upwardly as shown in FIG. 10 so that the pressure spring 20, acting between plate 19 and a point of the telescope, swings the telescope counter-clockwise and thus the plate clockwise, because the plate 19 through the spring 23 is held in contact with point 24, which point is connected with the ring 11 and thus is a fixed point. This movement is stopped when the arm 22 (which by means of screw 27 is displaceable parallel to the axis of the tube) comes into contact with the plate 19. Thereafter the nut 21 and thus the arm 22 are displaced by means of screw 27 (FIG. 11) so that the telescope is directed towards the lower end $S_2$ of the object.

The vertical plate 33 (FIG. 2) is provided with horizontal and vertical lines thereon which define a Cartesian coordinate system having an origin, ordinates and abscissae. For example, fifty ordinate division lines may extend to the right of the origin, thirty ordinate division lines may extend to the left, and forty abscissa lines may extend above and below the origin. The plate 33, which is parallel to the optical axis of the instrument, is carried by the upper part of the instrument by means of a balance device 34 formed in accordance with the parallelogram principle, so that it is movable in a vertical plane parallel with the optical axis of the tube, and so that the horizontal lines always are horizontal when the instrument is levelled. The said plate 33 is displaceable by means of the earlier mentioned nut 21 in a direction parallel with the optical axis, for a pin 35 on the nut 21 is mounted in a corresponding depression in the plate 33 (FIG. 4). The nut 21 is guided in a box 36 fixed to the tube. This box is at one side provided with slots for the pin 35 and at the other side with slots for a scale bar 37 having length graduation to the same scale as the plate 33. The zero line of the scale or bar 37 is located exactly opposite the centre of the pin 35. The origin of the chequered plate 33, on the other hand, is situated a short distance to the right from the pin 35, FIGURE 3, corresponding to the distance, in the scale of the chequered plate, from the horizontal axis to the vertical axis. The center of the field of vision in the read-off microscope 38 is constantly located in the horizontal azis, so that for a certain distance setting on the longitudinal scale 37 one can read off the corresponding difference of height and horizontal distance on the chequered plate 33. The difference of height is put on record and the horizontal distance is pricked graphically on the paper 1 in the following manner.

The paper 1 lies on the plate 39 retained thereagainst by the ring 5 which is pressed against the paper by the said springs. This ring can be lifted and thereby release the paper from the plate 39 by means of two devices which are independent of each other. One serves to lift the ring, when the paper shall be attached before the measuring operation or removed thereafter and has been described above, and the other one serves to lift the ring when the paper is to be moved during the course of the measuring operation. The latter device functions in the following manner: A horizontal screw 40 indisplaceably mounted in the said upper part, which is parallel with the vertical plane through the optical axis, is threaded with a pitch corresponding to the measure scale (at 1:800 the pitch is 1.25 mm. per revolution). A locking device 41 for the paper 1 has a smoothly bored hole through which the screw 40 goes. The threads of the latter are engaged by a threaded piece 43 of the locking device 41, which piece 43 can be released by means of a handle 42 mounted on shaft 42a (FIG. 4). Thus, due to this release the locking device 41 can with one grip be rapidly moved to any part of the screw 40. By turning the screw 40 by means of a knob 44 the locking device 41 can be slightly moved.

Figure 13:
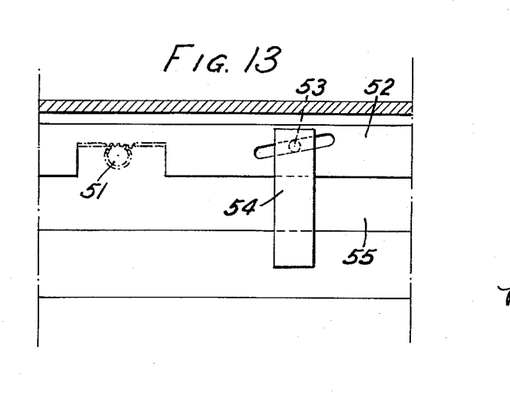
FIGURE 13 is a sectional view taken along line XIII—XIII of FIGURE 6.

In the locking device 41 a screw 45 is provided which is immovable relatively to the locking device. The screw 45 is in threaded engagement with a plate 46 (FIG. 2), so that the plate can be moved vertically when the screw 45 is turned. The plate 46 is guided in a square hole in the locking device so that it cannot be turned relatively to the latter. The plate 46 is divided into two along a horizontal plane, needles 47 provided with heads and going through the lower half being retained by the upper half which is screwed to the lower half. When the plate is moved downwards by turning the said screw 45, the needles 47 penetrate into the paper 1 and lock the latter in relation to the locking device 41 when the plate 46 has reached the lowest position, whereby the screw 45 can be turned no longer. An upwardly protruding part 48 of the plate 46 engages a corresponding recess provided in a smooth-bored tubular and likewise indisplaceable worm screw 49 surrounding the screw 45 (FIG. 5), when the plate 46 is located in an upper position in which the needles 47 do not penetrate into the paper 1. Thus, the screw 49 is then prevented from turning but is released when the plate 46 is screwed so far downwards that the needles penetrate into the paper, whereafter it is possible to turn the worm screw 49. The latter 49 is in mesh with teeth on the gear 50, whereby a rotary motion is also imparted to the latter. The said gear 50 is mounted round a profiled shaft 51 and is displaceable but not turnable in relation to the said shaft. The shaft 51 engages with teeth a gear ring on the ring 52. Thereby the ring 52 can be given a rotary motion in relation to the instrument. The ring 52 is provided with obliquely placed grooves, at least three and arranged symmetrically engaged by pins 53 attached to claws 54 (FIGS. 3 and 13) which are movable vertically in grooves in a ring 55 connected with the upper part. Therefore, when the ring 52 rotates the claws 54 will lift the ring 5 and thereby release the paper from the lower part of the instrument. Now the threaded piece 43 is released, whereafter the locking device 41 provided with an index is moved along a fixed scale 41a (FIG. 4), and thereby also the paper 1 is moved a distance in the scale of the map corresponding to the horizontal distance read off on the chequered scale 33 to the object aimed at. By means of the station pricking device 56 the station point can be marked on the paper. Thereafter the screws 49 and 45 are turned again, this time, however, in the reverse order and direction, so that the paper again is locked by the ring 5 to the plate 39 and is released from the locking device 41 by lifting the needles 47. Thus, the paper is released from the lower part of the instrument only after it has been locked relatively to the upper part of the instrument, and conversely, it is released from the upper part only after the locking to the lower part has been completed and thereby it cannot by mistake be loosened simultaneously from both the upper and the lower part, whereby the result of the measuring so far obtained would be spoilt. Furthermore after having been locked to the upper part, the paper can be moved only in one direction, which is parallel with the vertical plane through the optical axis of the tube. Besides, the displacement takes place without turning the paper. It should be mentioned that in analyzing the marks on the paper every measured and pricked point is encircled with a small ring. In doubtful cases when it is difficult to distinguish such contour prickings made by the paper moving and locking device, they may be distinguished by means of a transparent plate having rings etched thereon, arranged in relation to each other in the same way as the needles of the paper moving device. This method of detection is well known and accepted procedure in land surveying offices.

The instrument is loosened from the tripod and is fastened to the tripod on which the object until now has been placed, whereafter it is levelled and is set with reversed telescope to an object on the previous tripod. For this purpose a repetition device (not shown) is used, which in principle is provided in the usual manner and therefore need not be described in detail.

A source of light 57 can in the usual manner via mirror prisms illuminate horizontal and vertical circles and in a similar manner also the chequered plate 33. The images of these illuminated scales are observed in the usual manner in the microscope 38.

As to the length scale a special means must be provided in order that the image thereof shall be correctly turned independently of the inclination of the telescope.

From the source of light 57 some of the light goes via mirror prisms 58—59 connected with the said upper part to the length scale 37, and when the telescope is directed forwards, via a mirror prism 60 rigidly connected with the telescope, to the turnable mirror 66 and from there, via mirror prisms 61—62—63—64—65 (65 is not visible) to the microscope 38.

Figures 6, 12:
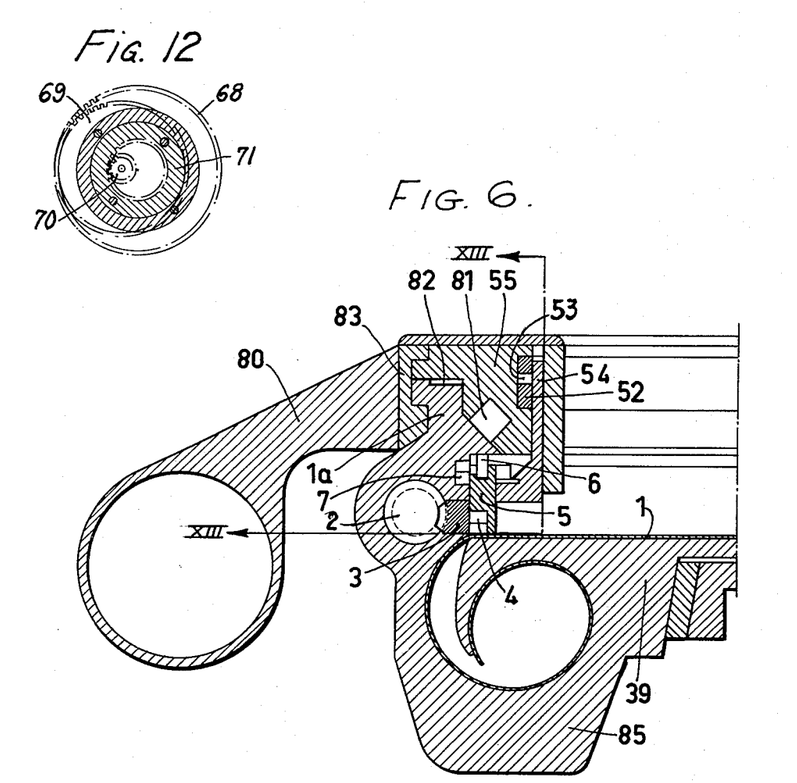
FIGURE 6 is an enlarged detailed view of the paper introducing means of FIGURE 3.
FIGURE 12 is a sectional view taken along line XII—XII of FIGURE 4.

In order that the image shall be stationary in the microscope 38 it must be reflected in a mirror 66, which, when the angle of inclination of the telescope is changed, is turned with an angular speed equal with the half of that of the telescope. This is effected by means of an internal gear ring 68 (FIG. 12) located on the tube shaft 67, which via gears 69, 70, 71 (71 with inner gear ring) transmits the rotary motion of the telescope to the mirror 66 fixed to the gear 71, which mirror is so placed that its surface lies in the horizontal axis. In order that the length scale 37 shall be visible, when the telescope is reversed, it is necessary that the surface of the mirror then faces the underside of the telescope. This is effected by turning the telescope one revolution. Then the mirror indeed has been turned only half a revolution.

In order to determine decimals exactly it is possible to use a well-known device consisting of a prism 72, here called refractor, through which the rays of light from the respective scale to the microscope pass, and which, by means of an adjustment micrometer, can be set in different angles, whereby the rays of light are subjected to a parallel displacement. Through a suitable adjustment of the refractor one scale line in the respective scale can be set to coincide with the fixed index of the microscope. The setting of the adjustment micrometer can be read-off on a scale indicated at 73 and which indicates the said decimals. As this device is entirely known per se and is not a subject matter of the invention, it will not be described in detail. Instead of reading-off the horizontal component of the displacement of the chequered plate, as described above, and in accordance therewith set the locking device 41 with the aid of a scale parallel with the screw 40, it is also possible to let the locking device, via a suitable gearing device, displace horizontally a horizontal scale, which has the same scale constant as the scale of the chequered plate and which is read-off in the microscope in the same field of image as the latter.

In the example shown in the drawing (FIG. 3), there is, for this purpose, mounted on a pivot 74 provided on the locking device 41, a toothed wheel 75 and a toothed wheel 76 rigidly connected therewith and of somewhat smaller diameter than the first-mentioned toothed wheel 75. The said first toothed wheel 75 is in mesh with a fixed rack 77 which is parallel with the screw 40 which engages the locking device, while the second toothed wheel 76 is in mesh with a rack 78 which is also parallel with the said screw, which rack 78 is displaceably arranged and connected with the said horizontal scale 79, the purpose being that the paper may be moved proportionally to the distance to the signal by turning the screw 40, until the image of the said horizontal scale 79 coincides in the microscope with the image of the vertical lines of the chequered plate 39, which earlier has been displaced proportionally to the said distance.

The telescope should suitably have an enlargement of about 30 times. The focusing can be made by means of knobs, one at the upper side and one at the lower side of the tube. One of them is always easily accessible, whether the telescope is directed forwards or is reversed.

A rod lamp battery of standard model is placed in a counterweight device 80 and the source of light may be a usual incandescent lamp of 3 volts. A displaceable prism of a suitable shape may distribute the light in such a manner that either the angle circuits or the other scales and always the micrometer scale will be illuminated.

The upper part with the alidade 55 is turnable in relation to the lower part 1a by means of ball or roller bearings 81. To the lower part 1a the horizontal circle 82 is attached, and the upper part 55 and the lower part 1a are held together by the ring 83, which also makes part of the locking and fine-adjustment device 8.

The pricking of the contours is carried out by a pricking device 56 in the locking device 41. The paper is larger than the plate 39 and is therefore rolled in spirals in support legs 85 which are three in number. Therefore the paper will not hide the vision when the aiming angle is steep, no matter how it is moved.

Between the paper and the plate 39 there is an easily flexible plastic plate, not shown, about 1 mm. thick, which permits substantial penetration of the needles into the paper at displacement and pricking of contours.

The devices shown and described are of course examples only, and different modifications of the device and change of details are possible within the scope of the claims.

What I claim is:

1. In a geodetic instrument for measuring the distance from the instrument to an object, said instrument having a stationary lower part adapted to be secured to a tripod, an upper part rotatably connected to said lower part about a vertical pivot axis, and a telescope pivotally connected to said upper part about a horizontal pivot axis normal to the axis of said telescope, the invention which comprises a plate substantially parallel to the vertical plane passing through the telescope, said plate being graduated with horizontal and vertical lines defining a Cartesian coordinate system having an origin, means connecting said plate to said upper part for guided movement parallel to itself, means for moving said plate relative to said upper part to cause the origin of the plate to be displaced along a line parallel with the optical axis of the tube from a zero position in the horizontal axis to a second position, the distance between said zero and second positions being a function of the distance between the instrument and the object, means for reading-off the magnitude of displacement of the origin of the plate from the zero horizontal axis position and for determining the components of displacement thereof, a paper record positioned on said lower part, and means for displacing said paper horizontally in a direction parallel with the vertical plane of the optical axis a distance proportional to the horizontal displacement of the plate.

2. Apparatus as defined in claim 1 wherein said means for guidably connecting said plate to said upper part comprises a parallelogram guiding device.

3. Apparatus as defined in claim 1 wherein said means for moving said plate relative to said upper part comprises a screw rotatably mounted in said upper part, a nut slidably movable and threadably mounted upon said screw, said nut being non-rotatably guided in said upper part, and pin means connected to said nut and engaging said plate.

4. Apparatus as defined in claim 3, wherein said means for reading-off the magnitude of displacement of the plate comprises a length scale bar secured to said nut, and microscope means secured to said upper part and optically directed upon said length scale bar.

5. Apparatus as defined in claim 4, and further including a substantially horizontal mirror arranged in the optical path intermediate said microscope means and said length scale bar, and gearing means connecting said mirror to said telescope to rotate said mirror about a horizontal axis by an angle which is half the angle of rotation of the telescope.

6. Apparatus as defined in claim 1 wherein said means for displacing the paper record includes a horizontal record adjusting screw rotatably mounted in said upper part parallel with the vertical plane through the optical axis of the telescope, and a paper locking and displacing device threadably connected to said screw for longitudinal movement relative to said upper part in the longitudinal direction of said record adjusting screw.

7. Apparatus as defined in claim 6 and further including means for disconnecting the screw thread connection of said paper locking and displacing device to said screw so that said device may be freely moved manually longitudinally of said screw.

8. Apparatus as defined in claim 7 and further including stationary scale means positioned adjacent and parallel to said record adjusting screw for indicating the extent of longitudinal movement of said paper locking and displacing device along said screw.

9. Apparatus as defined in claim 7 and further including a horizontal scale slidably mounted in said upper part, and gearing means connecting said scale to said paper locking device for movement therewith, said scale being graduated in accordance with the vertical lines of said plate.

10. Apparatus as defined in claim 9 wherein said gearing means comprises a first stationary rack connected to said upper part, a second stationary rack connected to said scale, a shaft pin secured to said paper locking and displacing device, a first pinion mounted on said shaft pin in engagement with said stationary rack and a second pinion on said shaft connected to said first pinion and in engagement with said second rack, said second pinion having a smaller diameter than said first pinion, said scale being visible by said read-off means simultaneoeusly with the viewing of the graduated plate by said read-off means whereby displacement of the paper by said paper locking and displacing means upon adjustment of said paper record adjusting screw will be proportional to the distance to the signal when the picture of the horizontal scale in the read-off means coincides with the picture of the vertical lines of the graduated plate.

11. Apparatus as defined in claim 6, and further including first means for releasably connecting said paper record to said lower part comprising a worm screw rotatably connected to the lower part, a horizontal ring above said record and connected to said lower part for vertical movement relative thereto, and means operable by said worm screw for raising and lowering said ring relative to said record.

12. Apparatus as defined in claim 11 and further including means for releasing said first means connecting said record to said lower part and for momentarily connecting said record to said upper part comprising a first vertical screw rotatably mounted in said paper locking and displacing device, pin means connected to said locking device and operable by said vertical screw to penetrate said paper record, a second vertical screw rotatably mounted in said locking device, and means operable by said second screw for raising said ring to release the paper record from said lower part.

13. Apparatus as defined in claim 4 and further including a bearing ring mounted in said upper part, the horizontal pivot axis of said telescope comprising a cylindrical telescope shaft portion extending from said telescope normal to the optical axis thereof and journalled in said bearing ring, means positioning said telescope shaft at a given angular position relative to said bearing ring, means releasing said positioning means to permit movement of said telescope shaft relative to said bearing ring, and spring means normally biasing said telescope shaft in a given direction for angular movement about said horizontal pivot axis relative to said bearing ring, said nut cooperating with said telescope shaft positioning means to restrict angular movement of said telescope in said given direction depending upon the longitudinal position of said nut in said upper part, whereby after the telescope has been trained toward the top of the object and the telescope shaft has been released from said bearing ring, the telescope may be trained toward the lower end of the object by longitudinal displacement of said nut upon rotation of the screw upon which said nut is mounted, the displacement of the nut and the graduated plate and length scale connected thereto being a measure of the distance from the instrument to the object.

14. Apparatus as defined in claim 13 wherein said telescope shaft positioning means comprises a telescope inclination plate pivotally connected at one end to said telescope shaft, and eccentric means pivotally connected to said telescope, said spring means including a first spring cooperating at one end with a lateral extension of said telescope shaft and pivotally biasing said plate into engagement with said eccentric means and a second spring cooperating at one end with an arm of said bearing ring and biasing said telescope inclination plate into engagement with a projection on said bearing ring arm.

15. Apparatus as defined in claim 14 wherein said means for releasing said telescope shaft from said bearing ring comprises means for pivoting said eccentric away from said telescope inclination plate including a knob rotatably connected to said upper part and having a pinion gear secured thereto, rack means driven by said pinion gear, and linkage means connecting said rack means to said eccentric means.

16. Apparatus as defined in claim 13, wherein said bearing ring is rotatably mounted in said upper part, and further including clamping means releasably engaging said bearing ring, and means for angularly adjusting the position of said clamping means relative to said upper part to adjust the angular position of said bearing ring and the inclination of said telescope when said clamping means is clamped upon said bearing ring.

No references cited.